United States Patent [19]

Corbett et al.

[11] 4,293,439

[45] Oct. 6, 1981

[54] GELLED SOLDER GLASS SUSPENSIONS FOR SEALING GLASS OR CERAMIC PARTS

[75] Inventors: Daniel W. Corbett, Beaver Dams; Donald L. Guile, Horseheads, both of N.Y.

[73] Assignee: Corning Glass Works, Corning, N.Y.

[21] Appl. No.: 193,627

[22] Filed: Oct. 3, 1980

Related U.S. Application Data

[62] Division of Ser. No. 934,348, Aug. 17, 1978, Pat. No. 4,260,406.

[51] Int. Cl.$^3$ .............................................. B01J 13/00
[52] U.S. Cl. .................................. 252/316; 106/177; 106/195; 106/197 R; 106/308 Q; 106/183; 106/178; 106/203; 156/89; 252/317; 260/429.5; 501/12; 501/15; 501/18; 501/20; 501/41; 501/49
[58] Field of Search .................... 65/43; 252/316, 317; 106/53, 48, 49, 195, 308 Q; 156/89

[56] References Cited

U.S. PATENT DOCUMENTS

| | | | |
|---|---|---|---|
| 3,251,704 | 5/1966 | Nellessen | 106/195 X |
| 3,334,053 | 8/1967 | Audrieth et al. | 252/316 |
| 3,954,486 | 5/1976 | Francel et al. | 106/53 |
| 4,018,717 | 4/1977 | Francel et al. | 106/53 X |
| 4,038,091 | 7/1977 | Francel et al. | 106/53 |
| 4,137,341 | 1/1979 | Adachi | 156/89 X |
| 4,163,004 | 7/1979 | Erickson et al. | 106/308 Q X |
| 4,260,406 | 4/1981 | Corbett et al. | 65/43 |

OTHER PUBLICATIONS

Ken-React Bulletin No.-0975-2, Kenrich Petrochemicals Inc., Bayonne, N.J.

*Primary Examiner*—Helen M. McCarthy
*Attorney, Agent, or Firm*—Kees van der Sterre

[57] ABSTRACT

A solder glass suspension for sealing glass or other ceramic parts is provided having the characteristics of a reversible gel, exhibiting high viscosity during storage and after extrusion onto a sealing surface, but relatively low viscosity under shear stress during extrusion. The use of the suspension for sealing glass or ceramic parts is also described.

22 Claims, No Drawings

GELLED SOLDER GLASS SUSPENSIONS FOR SEALING GLASS OR CERAMIC PARTS

This is a division, of application Ser. No. 934,348, filed Aug. 17, 1978, now U.S. Pat. No. 4,260,406.

BACKGROUND OF THE INVENTION

The present invention is in the field of ceramic sealing, and particularly relates to improved suspensions of fritted solder glasses useful for sealing together glass or other ceramic parts.

Solder glass suspensions have been used in the fabrication of many different kinds of assemblies comprising ceramic parts, including, for example, glass envelopes for electrical devices, glass-ceramic components for telescope mirror blanks, and ceramic substrates for electrical circuits. Such suspensions are typically provided in paste form, comprising a major proportion of fritted solder glass and a minor proportion of a pyrolyzable organic vehicle which burns away during the process of firing to effect sealing between the solder glass and the ceramic parts to be sealed.

One of the most demanding applications for solder glass suspensions is in the manufacture of cathode ray tube envelopes for television picture tubes and the like. Such envelopes are fabricated by sealing together a glass funnel member and a glass face plate or panel member. A solder glass suspension is applied by extrusion from a reservoir through an orifice in the shape of a continuous ribbon or bead to at least one of the mating surfaces provided on the panel and funnel, and these parts are joined and fired to provide an integral assembly wherein the fused solder glass provides a mechanically strong, high dielectric strength, hermetically sealed joint.

For this and similar applications, the pyrolyzable organic vehicle for the solder glass suspension typically comprises a cellulose binder and an organic solvent for the binder, e.g., a nitrocellulose binder with an amyl acetate solvent. Fritted solder glass additions of about 10-15 parts by weight of fritted glass for each part of organic vehicle are typically used to provide a suspension having the consistency of a paste, suitable for controlled dispensing onto a substrate to be sealed.

Although the use of suspensions of this type in the television industry is widespread and of long standing, several problems associated with such use remain. One problem is that, with time, such suspensions tend to separate into their respective glass and vehicle components, necessitating remixing prior to or during use.

Another problem is that the viscosity of such suspensions can change substantially over a relatively short time interval. In presently used systems for dispensing these suspensions, the dispensing rate is directly affected by the viscosity of the suspension, so that frequent adjustment of the dispensing machinery is required in order to achieve uniform and reproducible extrusion of the suspension onto a substrate. Also, the reductions in viscosity which typically occur on aging often produce sagging or running of the suspension after deposition on the substrate, resulting in a messy or mechanically defective seal.

These undesirable characteristics severly limit the useful life of presently used solder glass suspensions, typically to time periods on the order of hours or, at most, a few days. Accordingly, such suspensions are presently prepared at the point of use, in relatively small batches of a size which can be quickly used.

It is a principal object of the present invention to provide improved solder glass suspensions offering extended useful life and dispensing characteristics which are stable with time.

It is a further object of the invention to provide a method for extending the useful life of conventional solder glass suspensions from the present periods on the order of hours to periods of several months or more.

Other objects and advantages of the invention will become apparent from the following description thereof.

SUMMARY OF THE INVENTION

In accordance with the method of the present invention, the useful life of a solder glass suspension of the conventional type is significantly extended by adding a gelling agent to the suspension to impart a gelled structure thereto. The gelling agent is added in a proportion at least sufficient to render the suspension essentially non-settling and non-sagging under the influence of gravity. By settling is meant the separation of organic vehicle from fritted glass which occurs in a conventional solder glass suspension on standing. By sagging is meant the flow of a conventional suspension which occurs after it is deposited on a sealing surface.

Through the addition of a suitable gelling agent to a solder glass suspension of conventional type, a suspension having the characteristics of a reversible gel may be provided. In the normal non-flowable or gelled state which occurs on standing, such a suspension is non-settling under the influence of gravity, so that it can be stored for extended periods of time with only minor separation of its fritted glass and organic vehicle components. In the fluid state, which occurs after the suspension is sheared by remixing or dispensing, the suspension is relatively flowable and readily extruded. Finally, in the gelled state which recurs soon after dispensing, the suspension is non-sagging as well as non-settling under the influence of gravity, so that deformation or separation of the extruded suspension are avoided.

The essential constituents of a gelled solder glass suspension provided according to the invention are an organic vehicle, consisting essentially of a cellulose binder and an organic solvent for the binder, and a quantity of fritted solder glass. These vehicle and solder glass components are conventional and may consist of any of the various solder glass and organic vehicle systems utilized in the prior art for the sealing of ceramic parts as hereinabove described.

In addition to these frit and vehicle components, the solder glass suspension further includes a gelling agent which imparts a gelled structure to the glass-organic vehicle suspension. The quantity of gelling agent may be adjusted for any particular application, but the agent should be present in an amount at least sufficient to render the suspension essentially non-settling and non-sagging under the influence of gravity.

Gelling agents which are useful in accordance with the invention are those which do not adversely affect the sealing process or the mechanical integrity of the final seal. The agent may be evaporable or pyrolyzable, or it may remain in the seal in some form which is not deleterious to seal function.

For television and related applications, where the electrical properties of the seal are important, the gelling agent should not produce reduced burnout. Reduced burnout is defined as the chemical reduction of one or more of the oxide constituents of a solder glass during sealing, resulting when reducing conditions exist in the seal area. Although tolerable for some applications, reduced burnout reduces the dielectric strength of the seal and is thus undesirable where, as in television picture tubes, high voltages may be applied across the seal.

The best gelling agents are those having a strong, relatively permanent gelling effect when present in only minor proportions in the frit-vehicle mixture. Minor additions reduce the possibility that adverse effects on the burnout characteristics or other properties of the suspension or resulting seal will be encountered.

Both organic and inorganic gelling agents have been found useful in producing gelling in suspensions comprising a cellulose-based organic vehicle such as utilized in the prior art. Among the inorganic agents producing gelling in these systems are water, colloidal silica, and aluminosilicate clays such as bentonite, kaolinite and attapulgus clays. Colloidal silica and the clays produce gelling by thickening, while water produces gelling by flocculation. Among the organic agents which produce gelling in these same suspensions, typically by flocculation, are methanol, acetic acid, the lecithins, and the flocculating surfactants. The preferred gelling agents are flocculating surfactants, such as the fluorocarbon surfactants, surfactants based on lauryl sulfate, and surface-active organic titanates, with the latter being particularly preferred.

Reversible gelling behavior is desirable in a solder glass suspension because it permits dispensing of the suspension as a fluid while tending to inhibit flow in the dispensed material after it has been deposited on a substrate. The desirability of such behavior in applying coatings to glass fibers has been noted, for example, by Wong et al. in U.S. Pat. No. 3,533,768.

Through the use of suspensions having the characteristics of a reversible gel, a bead may be extruded onto a sealing surface which will retain its shape almost indefinitely. Sealing processes utilizing such suspensions are therefore expected to provide sealed ceramic assemblies which, on the average, are both functionally and cosmetically superior to ceramic assemblies sealed in accordance with the prior art.

DETAILED DESCRIPTION

The amount of gelling agent which must be added to a particular frit-vehicle mixture to produce a viscosity increase which will inhibit gravitational settling depends on the gelling agent selected, the relative amounts of fritted glass and vehicle in the suspension, and the particular vehicle system employed. A number of different cellulose binders have been proposed for use in these vehicle systems, including, for example, nitrocellulose, methyl cellulose, hydroxy propyl cellulose and combinations thereof. Similarly many different solvents having the capability of dissolving cellulose binders have been suggested, including, for example, amyl acetate, ethyl acetate, methyl amyl acetate, ethyl hexyl acetate, n-butyl acetate, isobutyl acetate, sec-butyl acetate, ethylene glycol monomethyl ether, diethylene glycol monobutyl ether and combinations thereof.

The most widely used vehicle systems typically contain a nitrocellulose binder, and are exemplified by a vehicle consisting essentially of nitrocellulose and amyl acetate. With the latter vehicle, suspensions comprising 10–15 parts by weight of fritted solder glass for each part by weight of vehicle are usually employed. The variety of gelling agents which will produce gelling in cellulose-based systems is shown by the number of different agents which can be used to produce gelling in a typical nitrocellulose-amyl acetate system, as listed in the Table below. Included in the Table are identifications of the types of agents used, approximate amounts of agent additions suitable for producing a useful degree of gelling of the suspension, expressed as weight percent of the vehicle, the primary effect of the agent on the suspension, and, in some cases, the burnout characteristics of the agent as the suspension is fired to form a fusion seal.

In each of the cases reported in the Table, the suspension to which the gelling agent was added comprised about 12.5 parts by weight of a fritted solder glass for each part by weight of organic vehicle. The organic vehicle consisted essentially of 1.2 parts of nitrocellulose and 98.8 parts of amyl acetate solvent, by weight.

TABLE

Gelling Agents for Solder Glass Suspensions

| Agent Type | Amount of Addition (wt. % of vehicle) | Effect on Suspension | Effect on Firing |
|---|---|---|---|
| $H_2O$ | ~1.0% | flocculant | reduced burnout |
| methanol | ~0.5% | flocculant | reduced burnout |
| surface-active organic titanate | ~0.1–0.3% | strong flocculant | good burn-out |
| lauryl sulfate surfactant | ~0.1% | flocculant | good burn-out |
| fluorocarbon surfactant | ~0.5% | flocculant | good burn-out |
| liquid polymer emulsion | ~0.2–1.0% | flocculant | reduced burnout |
| fumed colloidal silica | ~0.5–1.0% | thickener | good burn-out |
| acetic acid | ~0.5% | flocculant | |
| attapulgus clay | ~0.5–2.0% | thickener | |
| lecithin | ~0.5–1.0% | flocculant | |

Of course, the list of gelling agents provided in the foregoing Table merely illustrates the wide variety of different agents which will produce gelling in solder glass suspensions such as are presently used in the art, and is not intended to be limiting.

Preferred gelling agents for use in combination with suspensions comprising a cellulose-containing organic vehicle are certain surface-active organic titanates, commonly known in the petrochemical art as titanate coupling agents. These preferred coupling agents are of the formula:

$$(RO)_x\text{-Ti-}[OX\text{-}(R^2)_{1-2}]_{4-x}$$

wherein RO is a coupling group consisting of an oxyacetate group or an alkoxy or aryloxy group of from 2–10 carbon atoms, Ti is tetravalent titanium, x is 1 or 2, corresponding to the number of titanium bonding sites occupied by RO coupling groups, OX is a carboxy, phosphato or pyrophosphato binding group, and $R^2$ is an aliphatic or aromatic hydrocarbon backbone group of from 6–20 carbon atoms.

The properties and uses of titanate coupling agents vary widely depending upon the chemical structure of the coupling agent and the system in which it is employed. In solder glass frit-organic vehicle suspensions of the type used for sealing ceramics, the aforementioned coupling agents have been found to function as flocculating surfactants, producing both strong, permanent gelling and reshear viscosities (i.e., viscosities after shearing the gel) similar to those of ungelled suspensions. In addition, suspensions gelled with these agents re-gel rapidly after shearing is terminated, so that gravitational sagging of a dispensed bead is virtually eliminated.

Most importantly, the resheared viscosity of the suspension is quite stable with time. This factor, combined with high resistance to settling, permits a gelled suspension to be prepared and then stored for several months prior to use without unacceptable deterioration in the properties of the suspension. Hence, after reshearing by extrusion or preferably, by brief shaking prior to use, a stored suspension exhibits dispensing characteristics essentially equivalent to those of freshly prepared gelled suspensions.

The preparation and use of gelled solder glass suspensions are more fully described in the following detailed examples, which represent preferred embodiments of the invention.

EXAMPLE I

An organic vehicle for a gelled solder glass suspension is prepared by adding 1.2 parts by weight of a nitrocellulose binder to about 98.8 parts by weight of amyl acetate solvent. The nitrocellulose selected for use as the binder is a Hercules ® RS-type nitrocellulose, containing about 12% nitrogen by weight and having a viscosity grade of 1500–2000 seconds when tested by the standard ASTM falling ball method, being commercially available from Hercules, Inc., Wilmington, Del. The temperature of the solvent is about 25° C., and the binder is added with slow stirring until solution is complete.

Thereafter, about 0.30 parts by weight of a titanate coupling agent is mixed into the vehicle with slow stirring, the titanate coupling agent being identified as titanium di(dioctylpyrophosphate) oxyacetate of the formula:

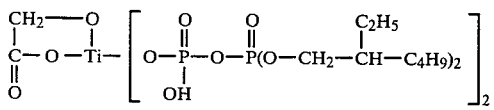

and being commercially available in the form of a solution as Ken-React 138S titanate coupling agent from Kenrich Petrochemicals, Inc., Bayonne, New Jersey. The presence of this coupling agent in the organic vehicle does not significantly affect the viscosity thereof, in the absence of fritted glass.

After the organic vehicle has been thoroughly mixed, 1 part by weight thereof is introduced into a planetary mixer and 12.5 parts by weight of a fritted solder glass are slowly added to the vehicle with continuous mixing until a homogeneous suspension of the glass in the vehicle is provided. The fritted solder glass used in the suspension is a devitrifiable $PbO-ZnO-B_2O_3$ solder glass, having an average particle size of about 15–30 microns, commercially available as Corning Code 7590 solder glass from Corning Glass Works, Corning, New York.

The viscosity of this suspension immediately after mixing is not significantly higher than a suspension of similar composition from which the titanate coupling agent has been omitted. Thus the suspension can at this point be readily transferred into storage or dispensing containers by pouring. Within a few hours after mixing, however, the apparent viscosity of the suspension increases to a rest viscosity significantly greater than that of the original suspension, and the mixture has developed a highly gelled structure. The suspension is highly resistant to settling, and only slight separation of vehicle therefrom occurs after standing for several days.

The application of the gelled suspension to a sealing surface is conveniently accomplished by reshearing the suspension, for example by shaking in a closed container on a paint shaker for an interval of about 3 minutes, and then pouring the resheared suspension into a dispensing device. A suitable device consists of a 50 cc syringe with a 1-inch diameter plunger and a ⅛-inch orifice. The suspension is readily extruded through this orifice and onto the surface of a glass article to form a cylindrical bead of suspension by applying an extrusion force of approximately 40 pounds to the syringe plunger. The extruded bead thus formed exhibits excellent shape stability characterized by the complete absence of solvent separation and bead sagging on standing.

The above-described reshearing step of shaking prior to extrusion, although preferred, is not essential to the dispensing of a gelled solder glass suspension in accordance with the invention. In an alternative method, a quantity of gelled suspension which has been stored in a syringe dispenser may be directly extruded onto a sealing surface without prior reshearing. Extrusion from the syringe is initiated by the application of sufficient additional force to overcome the yield force of the gel, after which reshearing of the gel is accomplished as the suspension passes through the extrusion orifice. After reshearing has been initiated, the force necessary for dispensing falls to a value essentially equivalent to that required for extruding a mixture separately resheared by shaking.

The firing and sealing characteristics of the solder glass suspension of the Example are found to be essentially equivalent to those of a similar suspension from which the titanium di(dioctylpyrophosphate) oxyacetate coupling agent has been omitted. A seal is formed by applying a bead of the suspension of the Example to the sealing edge of a cathode ray tube funnel, joining the funnel to a faceplate, and firing the resulting assembly in accordance with a conventional cathode ray tube sealing schedule. The resulting seal exhibits the high dielectric strength necessary for a cathode ray tube bulb, and examination of the seal region indicates that the seal is free of the darkening discoloration caused by reduced burnout.

The aging characteristics of gelled solder glass suspensions prepared according to the Example are tested by storing samples of the suspension for extended periods of time and then examining the stored samples to evaluate the extent of separation which has occurred, and the reshearing and viscosity characteristics of the samples. Samples of the gelled suspension opened after storage intervals of up to 6 months show no significant vehicle separation beyond the slight separation which occurs during the first few days of storage.

The resheared viscosity characteristics of aged samples of suspension provided according to the Example are evaluated by remixing the stored samples by a 3-minute shaking interval on a paint shaker as above described, followed by extrusion of the samples onto a glass surface. It is found that the forces necessary for the extrusion of these aged samples do not vary significantly from the force necessary to extrude freshly prepared gelled samples. Typically, the force necessary to dispense resheared aged samples falls within the range of about 30–45 pounds of force using the syringe dispensing apparatus above described. Thus it is concluded that the aged suspension is suitable in all respects for any of the sealing applications for which freshly prepared suspensions are suited.

EXAMPLE II

An organic vehicle for a gelled solder glass suspension is prepared in accordance with the procedure described in Example I, except that the titanate coupling agent therein described is replaced by 0.20 parts by weight of a titanate coupling agent identified as isopropyl tri(dioctylpyrophosphato) titanate, of the formula:

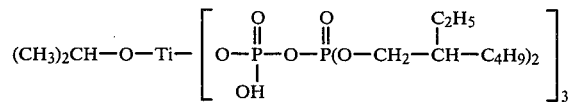

This coupling agent is commercially available in the form of a solution as Ken-React 38S titanate coupling agent from Kenrich Petrochemicals Inc., Bayonne, New Jersey.

To one part by weight of the organic vehicle thus provided are added 12.5 parts by weight of fritted Corning Code 7590 solder glass as in Example I, with mixing being continued until a homogeneous suspension of the solder glass in the vehicle is provided. Within a few hours after mixing, gellation of the solder glass suspension occurs.

The gelled suspension produced using this coupling agent exhibits resistance to settling and vehicle separation which are essentially equivalent to the corresponding characteristics of the solder glass suspension of Example I. This suspension is somewhat more easily resheared and extruded, however, probably because of the relatively small concentration of titanium coupling agent employed. Typically, dispensing forces on the order of about 30–35 pounds are required for dispensing this suspension using the syringe apparatus described in Example I.

The resheared viscosity characteristics of aged samples of this suspension are quite stable over storage intervals of at least several months. The firing and sealing characteristics of the suspension are quite satisfactory for television tube sealing applications.

EXAMPLE III

An organic vehicle for a gelled solder glass suspension is prepared in accordance with the procedure described in Example I, except that the titanate coupling agent therein described is replaced by 0.3 parts by weight of a titanate coupling agent identified as isopropyl tri(dioctylphosphato) titanate of the formula:

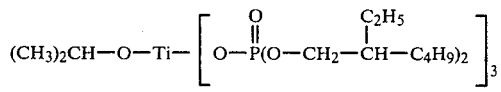

This coupling agent is commercially available in the form of a liquid as Ken-React 12 titanate coupling agent from Kenrich Petrochemicals, Inc., Bayonne, New Jersey.

To 1 part by weight of this vehicle are added 12.5 parts by weight of fritted Corning Code 7590 solder glass as in Example I, with mixing being continued until a homogeneous suspension is achieved. Gellation of this suspension occurs within a few hours after mixing.

A gelled suspension produced as described exhibits good resistance to settling and vehicle separation, and relatively consistent reshearing viscosity characteristics after storage. The viscosity of a freshly prepared suspension after gellation and reshearing is such that dispensing forces on the order of 25–30 pounds are required for extrusion using the apparatus described in Example I.

The slightly lower dispensing viscosity of this suspension is believed to result from the slightly weaker gelling characteristics of the titanate coupling agent employed. Again, the firing and sealing characteristics of this suspension are satisfactory for television tube sealing applications.

EXAMPLE IV

An organic vehicle for a gelled solder glass suspension is prepared in accordance with the procedure of Example I, except that the titanate coupling agent described therein is replaced by 0.3 parts by weight of a titanate coupling agent identified as isopropyl triisostearyol titanate of the formula:

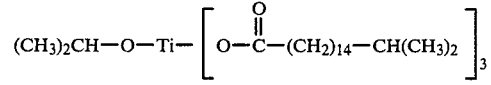

This coupling agent is commercially available in the form of a liquid as Ken-React TTS titanate coupling agent from Kenrich Petrochemicals, Inc., Bayonne, New Jersey.

To one part by weight of this vehicle are added 12.5 parts by weight of fritted Corning Code 7590 solder glass as in Example I, with mixing being continued until a homogeneous suspension is achieved. Gellation of the suspension occurs within a few hours after mixing.

A gelled suspension produced as described exhibits good resistance to settling and vehicle separation on storage. Also, the reshearing viscosity characteristics of this suspension are quite stable with time.

The resheared viscosity of freshly prepared and stored samples of this suspension is such that dispensing forces on the order of 20–25 pounds are required for extruding the suspension utilizing the apparatus described in Example I. These lower dispensing forces are again ascribed to the slightly weaker gelling characteristics of this coupling agent. The firing and sealing properties of suspensions comprising this coupling agent render them suitable for television tube sealing applications.

EXAMPLE V

An organic vehicle for a gelled solder glass suspension is prepared in accordance with the procedure of Example I, except that the titanate coupling agent used in that Example is replaced by 1.0 parts by weight of a colloidal silica gelling agent, commercially available as CAB-O-SIL fumed silica from the Cabot Corporation, Boston, Massachusetts. This gelling agent is dispersed in the organic vehicle by slow addition thereto while agitating the mixture with a high-shear mixer, with mixing being continued until thorough dispersion of the silica in the vehicle has been achieved.

To 1 part by weight of the resulting vehicle are added 12.5 parts by weight of fritted Corning Code 7590 solder glass as in Example I, with mixing being continued until a homogeneous suspension of the glass in the vehicle is achieved. Gellation of this suspension occurs within a few hours after mixing.

A gelled suspension produced as described exhibits good resistance to settling and vehicle separation on standing, and may be resheared by shaking to reestablish a flowable viscosity for dispensing. Extruded bead provided using this suspension exhibits good shape retention and resistance to sagging.

Although silica remains in the extruded solder glass after burnout of the vehicle and fusion of the glass to form a seal, no significant adverse effects on the electrical or mechanical properties of the seal appear to result from the retained silica. Thus the suspension is quite suitable for television tube sealing and related applications.

Although the foregoing examples illustrate the typical range of characteristics exhibited by gelled solder glass suspensions provided in accordance with the invention, it will be appreciated that variations in these characteristics may readily be provided by modifying the formulation or preparation of the suspension to achieve properties suitable for any particular sealing application. Of course, the strength of the gelled state in these solder glass systems is dependent not only on the amount of the gelling agent introduced into the system, but also on the relative amounts of solder glass and vehicle present and, to some degree, on the temperature of the suspension. In general, gel strength and dispensing force may be reduced by reducing the amount of gelling agent employed, by using a relatively weak gelling agent, by increasing the temperature of the gel above normal ambient, or by decreasing the relative amount of fritted solder glass in the suspension.

The rheological characteristics of these gelled solder glass suspensions are complex and have not yet been fully defined. However, various combinations of viscoelastic, pseudoplastic and thixotropic behavior have been observed in representative systems comprising titanate coupling agents as hereinabove described.

One of the most desirable properties of these titanate-containing suspensions is a relatively low yield stress, which is defined as that stress required to initiate fluid flow, but below which the suspension acts as a solid. This yield stress presumably arises from interparticle forces exerted through the cellulose binder molecules, due to organic coupling which is readily disrupted by shearing but quickly reestablished on standing. This mechanism could explain the post-extrusion regelling behavior which gives rise to excellent bead shape stability in these gelled systems.

We claim:

1. A solder glass suspension having the characteristics of a reversible gel, suitable for the application of fritted solder glass to the surface of a glass or ceramic part to be sealed, which comprises:
   an organic vehicle consisting essentially of a cellulose binder and an organic solvent for the binder;
   a fritted solder glass; and
   a gelling agent in a proportion at least sufficient to render the solder glass suspension essentially non-settling and non-sagging under the influence of gravity, while permitting said suspension after it is sheared by remixing or dispensing to become relatively flowable and readily extrudable onto a sealing surface, yet while permitting said suspension after extrusion to rapidly regel to retain its extruded shape and to be essentially non-flowable, non-settling and non-sagging under the influence of gravity, the gelling agent being one which does not adversely affect the sealing process or the mechanical integrity of the final seal.

2. A solder glass suspension in accordance with claim 1 wherein the gelling agent is an inorganic agent selected from the group consisting of colloidal silica, bentonite clay, kaolinite clay, and attapulgus clay.

3. A solder glass suspension in accordance with claim 1 wherein the gelling agent is an organic agent selected from the group consisting of acetic acid, lecithin, and the flocculating surfactants.

4. A solder glass suspension in accordance with claim 3 wherein the flocculating surfactant is selected from the group consisting of fluorocarbon surfactants, lauryl sulphate surfactants, and surface-active organic titanates.

5. A solder glass suspension in accordance with claim 1 which comprises a nitrocellulose binder.

6. A solder glass suspension in accordance with claim 5 wherein the gelling agent is a titanate coupling agent of the formula:

wherein RO is a coupling group consisting of an oxyacetate group or an alkoxy or aryloxy group of from 2–10 carbon atoms, Ti is tetravalent titanium, x is 1 or 2, corresponding to the number of titanium bonding sites occupied by RO coupling groups, OX is a carboxy, phosphato or pyrophosphato binding group, and $R^2$ is an aliphatic or aromatic hydrocarbon backbone group of from 6–20 carbon atoms.

7. A solder glass suspension in accordance with claim 6 wherein the gelling agent is titanium di(dioctylpyrophosphate) oxyacetate of the formula:

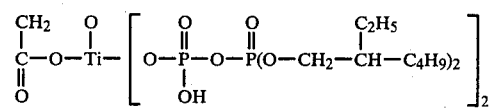

8. A solder glass suspension in accordance with claim 6 wherein the gelling agent is isopropyl tri(dioctylpyrophosphato) titanate of the formula:

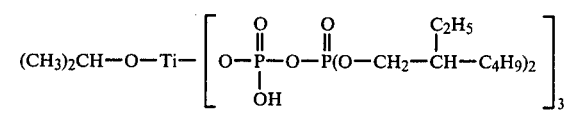

9. A solder glass suspension in accordance with claim 6 wherein the gelling agent is isopropyl tri(dioctylphosphato) titanate of the formula:

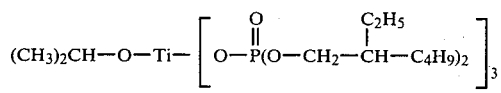

10. A solder glass suspension in accordance with claim 6 wherein the gelling agent is isopropyl triisostearyol titanate of the formula:

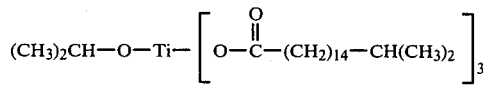

11. A solder glass suspension in accordance with claim 2 wherein the gelling agent is colloidal silica.

12. A method for extending the useful life of a solder glass suspension, the solder glass suspension comprising a fritted solder glass in an organic vehicle and the organic vehicle consisting essentially of a cellulose binder and an organic solvent for the binder, which comprises the step of:

adding a gelling agent to the suspension to impart a reversibly gelled structure thereto, the gelling agent being added in a proportion at least sufficient to render the suspension essentially non-settling and non-sagging under the influence of gravity, while permitting said suspension after it is sheared by remixing or dispensing to become relatively flowable and readily extrudable onto a sealing surface, yet while permitting said suspension after extrusion to rapidly regel to retain its extruded shape and to be essentially non-flowable, non-settling and non-sagging under the influence of gravity, the gelling agent being one which does not adversely affect the sealing process or the mechanical integrity of the final seal.

13. A method in accordance with claim 12 wherein the gelling agent is an inorganic agent selected from the group consisting of colloidal silica, bentonite clay, kaolinite clay, and attapulgus clay.

14. A method in accordance with claim 12 wherein the gelling agent is an organic agent selected from the group consisting of acetic acid, lecithin, and the flocculating surfactants.

15. A method in accordance with claim 14 wherein the flocculating surfactant is selected from the group consisting of fluorocarbon surfactants, lauryl sulfate surfactants, and surface-active organic titanates.

16. A method in accordance with claim 12 wherein the cellulose binder is nitrocellulose.

17. A method in accordance with claim 16 wherein the gelling agent is a titanate coupling agent of the formula:

$$(RO)_x\text{-Ti-}[OX\text{-}(R^2)_{1\text{-}2}]_{4\text{-}x}$$

wherein RO is a coupling group consisting of an oxyacetate group or an alkoxy or aryloxy group of from 2–10 carbon atoms, Ti is tetravalent titanium, x is 1 or 2, corresponding to the number of titanium bonding sites occupied by RO coupling groups, OX is a carboxy, phosphato or pyrophosphato binding group, and $R^2$ is an aliphatic or aromatic hydrocarbon backbone group of from 6–20 carbon atoms.

18. A method in accordance with claim 17 wherein the gelling agent is titanium di(dioctylpyrophosphate) oxyacetate of the formula:

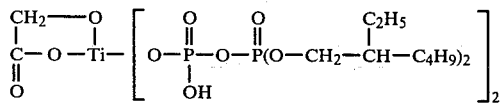

19. A method in accordance with claim 17 wherein the gelling agent is isopropyl tri(dioctylpyrophosphato) titanate of the formula:

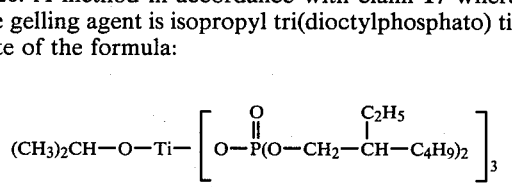

20. A method in accordance with claim 17 wherein the gelling agent is isopropyl tri(dioctylphosphato) titanate of the formula:

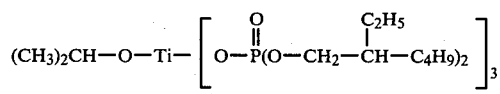

21. A method in accordance with claim 17 wherein the gelling agent is isopropyl triisostearyol titanate of the formula:

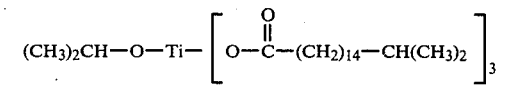

22. A method in accordance with claim 13 wherein the gelling agent is colloidal silica.

* * * * *